United States Patent
Bui et al.

(10) Patent No.: US 9,563,314 B2
(45) Date of Patent: *Feb. 7, 2017

(54) EDGE TO EDGE TOUCH SCREEN

(71) Applicant: Dell Products, LP, Round Rock, TX (US)

(72) Inventors: Vinh X. Bui, Round Rock, TX (US); Gerald L. Pelissier, Mendham, NJ (US); Alan Luecke, Cedar Creek, TX (US); Shih-Kai Wang, Taipei (TW)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,772

(22) Filed: Jan. 13, 2016

(65) Prior Publication Data

US 2016/0124578 A1 May 5, 2016

Related U.S. Application Data

(63) Continuation of application No. 13/865,806, filed on Apr. 18, 2013, now Pat. No. 9,250,744.

(51) Int. Cl.
*G06F 3/042* (2006.01)
*G02B 6/43* (2006.01)
*F21V 8/00* (2006.01)

(52) U.S. Cl.
CPC .......... *G06F 3/0421* (2013.01); *G02B 6/0023* (2013.01); *G02B 6/43* (2013.01); *Y10T 29/49105* (2015.01)

(58) Field of Classification Search
CPC ..................................................... G06F 3/0421
USPC ........................................................... 345/173
See application file for complete search history.

(56) References Cited

U.S. PATENT DOCUMENTS

| | | | |
|---|---|---|---|
| 4,868,551 A | 9/1989 | Arditty et al. |
| 7,491,441 B2 | 2/2009 | Pokorny et al. |
| 8,309,202 B2 | 11/2012 | Kojima et al. |
| 8,641,214 B1 | 2/2014 | Batchko |
| 9,028,123 B2 | 5/2015 | Nichol et al. |
| 9,110,200 B2 | 8/2015 | Nichol et al. |
| 2003/0164820 A1 | 9/2003 | Kent |
| 2007/0031097 A1 | 2/2007 | Heikenfeld et al. |
| 2008/0218951 A1 | 9/2008 | Kusuda et al. |
| 2009/0153519 A1 | 6/2009 | Suarez Rovere |
| 2010/0002305 A1 | 1/2010 | Suzuki |
| 2011/0158601 A1 | 6/2011 | Lew |
| 2011/0163997 A1 | 7/2011 | Kim |
| 2011/0257494 A1 | 10/2011 | Glazier et al. |
| 2013/0265262 A1 | 10/2013 | Jung et al. |
| 2015/0193098 A1 | 7/2015 | Kauffmann et al. |

OTHER PUBLICATIONS

"Planar Scatter Detection Technology," 2009, Flatfrog Laboratories AB, http://www.flatfrog.com/technology.

*Primary Examiner* — Fred Tzeng
(74) *Attorney, Agent, or Firm* — Larson Newman, LLP

(57) ABSTRACT

A method includes printing a colorant on a film to define an opaque border region and a transparent active display area portion, bonding the film to a waveguide, and assembling a touch screen. The touch screen includes a display assembly for displaying images, an emitter/detector assembly, the waveguide, and the film.

18 Claims, 5 Drawing Sheets

EDGE TO EDGE TOUCH SCREEN

CROSS REFERENCE TO RELATED APPLICATIONS

This application is a continuation of U.S. patent application Ser. No. 13/865,806, entitled "Edge to Edge Touch Screen," filed on Apr. 18, 2013, the disclosure of which is hereby expressly incorporated by reference in its entirety.

FIELD OF THE DISCLOSURE

This disclosure generally relates to information handling systems, and relates more particularly to systems having edge to edge touch screens.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
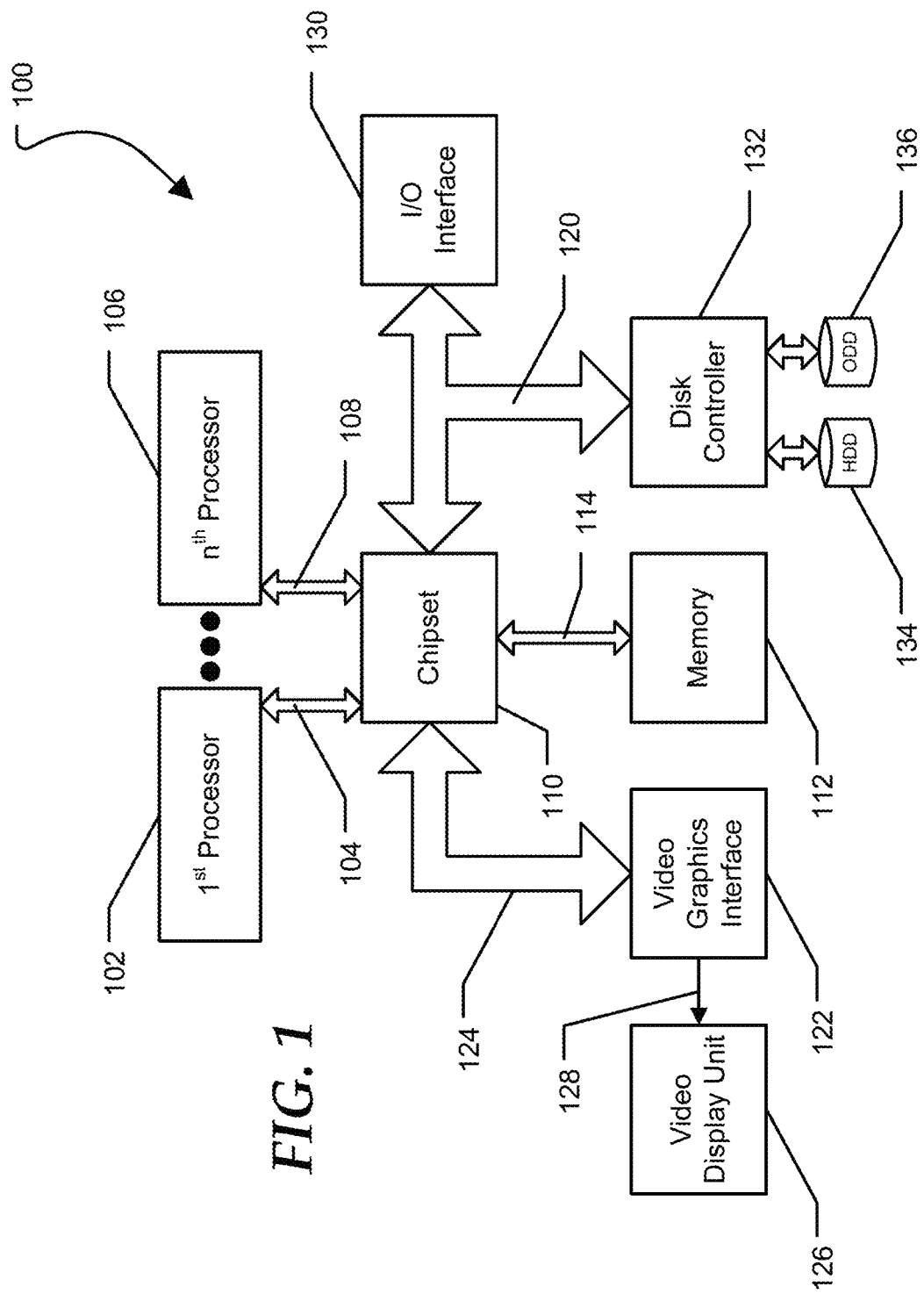
FIG. 1 illustrates a block diagram of an information handling system according to one aspect of the disclosure.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the n$^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

In various embodiments, an information handling system may utilize a touch sensitive display assembly for the combined functionality of the video display and input devices such as mouse and keyboard. Various technologies are known in the art for detecting touch inputs, such as capacitive touch detection, resistive touch detection, surface acoustic wave detection, infrared grid detection, optical imaging, acoustic pulse recognition, infrared acrylic projection, dispersive signal detection, and planar scatter detection. The touch detection technology can rely upon emitters, detectors, or connections around the edge of the display, and it can be desirable to obscure those emitters, detectors, or connections.

Figure 2:
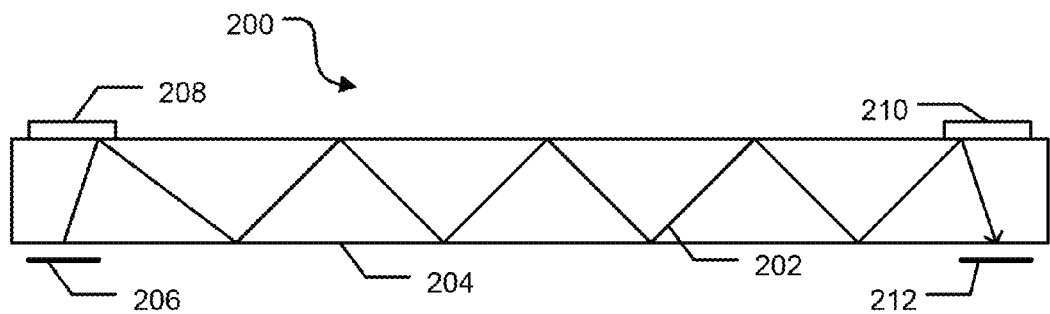
FIGS. 2 and 3 are diagrams illustrating planar scatter detection according to an aspect of the disclosure.
Figure 3:
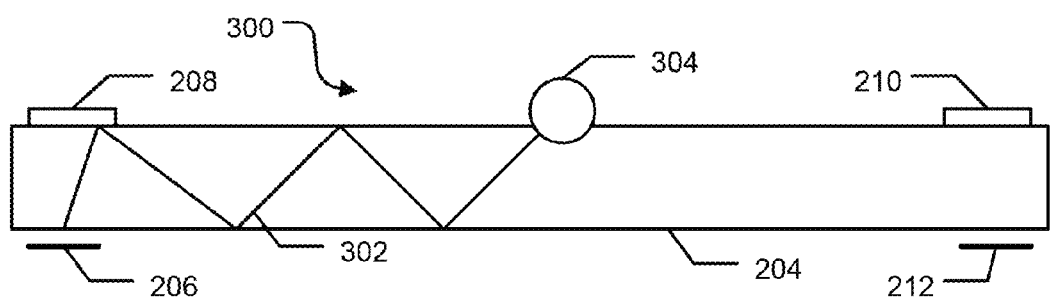

FIG. 2 illustrates a light path 202 through waveguide 204 when using planar scatter detection to detect touch inputs. Emitter 206 can inject light into the waveguide 204. A diffuser can scatter the light at multiple angles, at least one of which can travel along light path 202 and rely upon total internal reflection to follow the waveguide 204. When the light path 202 reaches diffuser 210, the light can be scattered with at least a portion going to detector 212. FIG. 3 illustrates a disrupted light path 302 through waveguide 204 when contact 304 is made on the surface of waveguide 204.

Figure 4:
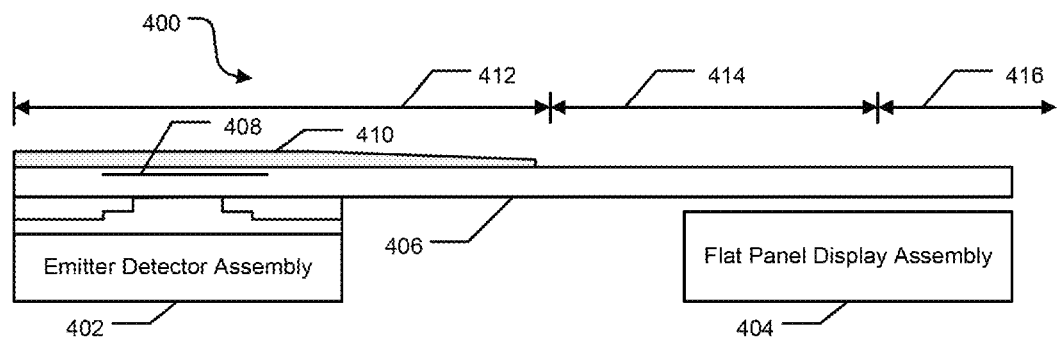
FIGS. 4 and 5 are diagrams illustrating an exemplary touch sensitive display assembly according to an aspect of the disclosure.

FIG. 4 illustrates a cross section 400 of a touch sensitive display assembly. TSDA 400 can include an emitter/detector assembly 402 and a flat panel display assembly 404 adjacent to the emitter/detector assembly 402. A waveguide 406 can overlie the emitter/detector assembly 402 and a flat panel display assembly 404. Diffuser 408 can be positioned to overlie waveguide 406 positioned opposite emitter/detector assembly 402. Bezel 410 can be positioned over waveguide 406 so as to obscure emitter/detector assembly 402 and allow viewing of at least a portion of flat panel display assembly 404. Touch sensitive display assembly can have a bezel region 412, a bezel free border region 414, and an active display area 416. The bezel free border region 414 may provide a separation between the bezel 410 and the active display area 416 to enable touch contact over the entire active display area 416 without being blocked by contact with the bezel 410. The bezel free border region 414 may be about 20 mm, as required by Microsoft's Windows Hardware Quality Labs requirement for Win 8 Touch.

Figure 5:
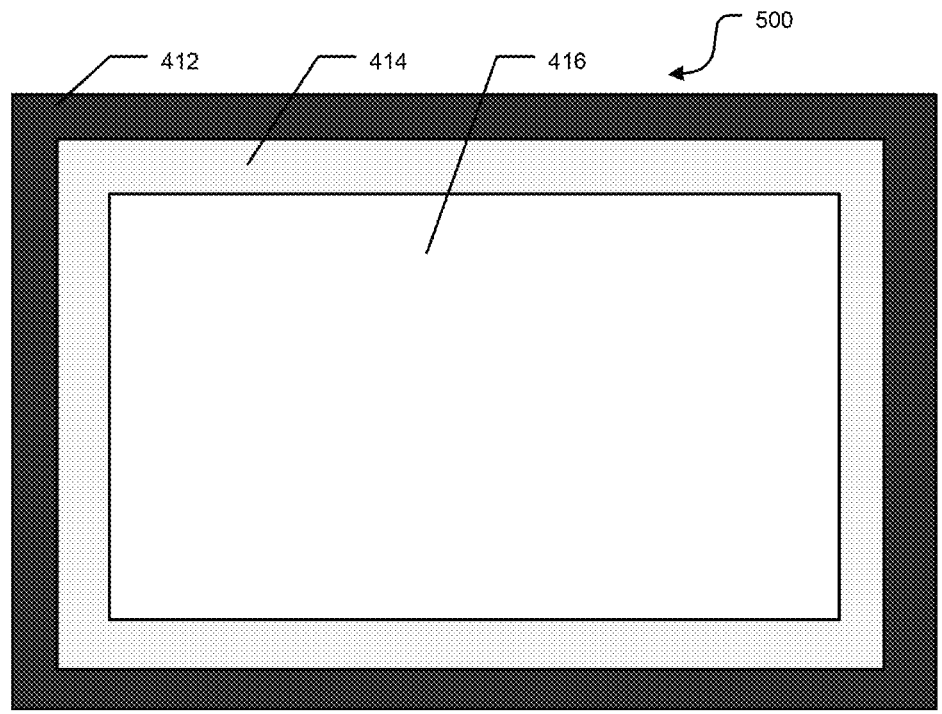

FIG. 5 illustrates a surface view 500 of touch sensitive display assembly. Active display area 416 can define the center portion of the touch sensitive display assembly surface view 500 and the bezel region 412 can define the perimeter of the touch sensitive display assembly surface view 500. Bezel free border region 414 can define a region separating the bezel region 412 and the active display area 416.

Figure 6:
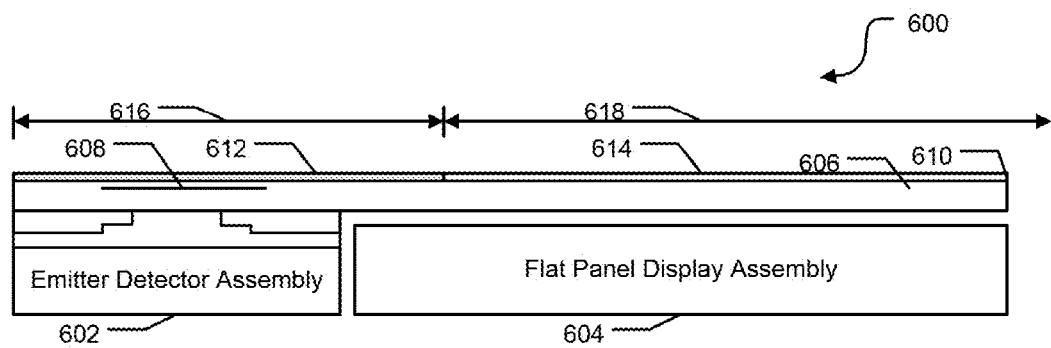
FIGS. 6 and 7 are diagrams illustrating an exemplary touch sensitive display assembly according to an aspect of the disclosure.

FIG. 6 illustrates a cross section 600 of a touch sensitive display assembly. Touch sensitive display assembly can include an emitter/detector assembly 602 and a flat panel display assembly 604 adjacent to the emitter/detector assembly 602. A waveguide 606 can overlie the emitter/detector assembly 602 and a flat panel display assembly 604. The waveguide 606 can include glass or poly(methyl methacrylate). In various embodiments, the waveguide can be a flat sheet or can be curved. Diffuser 608 can be positioned to overlie waveguide 606 positioned opposite emitter/detector assembly 602. Surface film 610 can be adhered to the surface of waveguide 606 opposite the emitter/detector assembly 602 and flat panel display assembly 604. In various embodiments, the surface film 610 can be a polyethylene terephthalate film. In various embodiments, surface film 610 can have a thickness of between about 0.1 mm and about 1.0 mm. Surface film 610 can include a border portion 612 overlying the emitter/detector assembly 602 and an active display area portion 614 overlying at least a portion of the flat panel display assembly 604. Border portion 612 can be opaque to obscure the emitter/detector assembly 602, while active display area portion 614 can be transparent to allow viewing of the flat panel display assembly 604. Touch sensitive display assembly can have a border region 616 and an active display area 618. With the smooth surface of the surface film (absent a raised bezel), it may not be necessary to have a separation between the border region 616 and the active display area 618. Thus, the active display area 618 can be larger for the same overall size of the touch sensitive display assembly.

In various embodiments, the border portion 612 can be formed by printing a colorant, such as ink, on the surface of the surface film 610 that will contact the waveguide 606. By printing on the surface in contact with the waveguide 606, the colorant will be protected from marking and scratching by the surface film 610. In various embodiments, the border portion 612 can be a solid color formed by the combination of one or more colorants. In alternate embodiments, the border portion 612 can have multiple colorants applied in a manner to form a pattern, image, or text viewable when using the touch sensitive display assembly.

Figure 7:
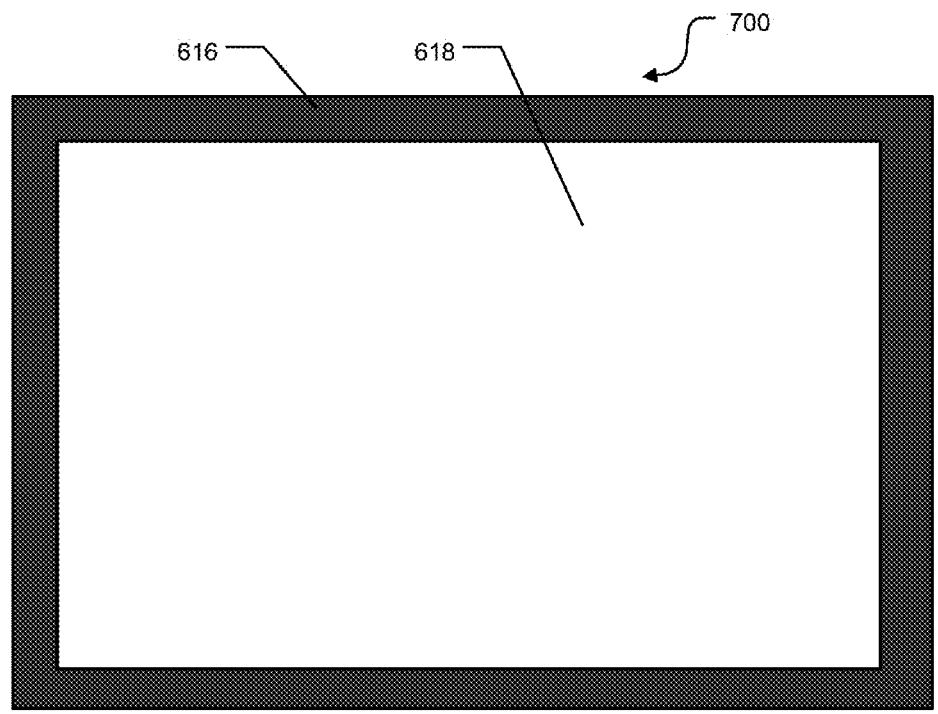

FIG. 7 illustrates a surface view 700 of touch sensitive display assembly. Active display area 616 can define the center portion of the touch sensitive display assembly surface view 700 and the border portion 612 can define the perimeter of the touch sensitive display assembly surface view 700.

Figure 8:
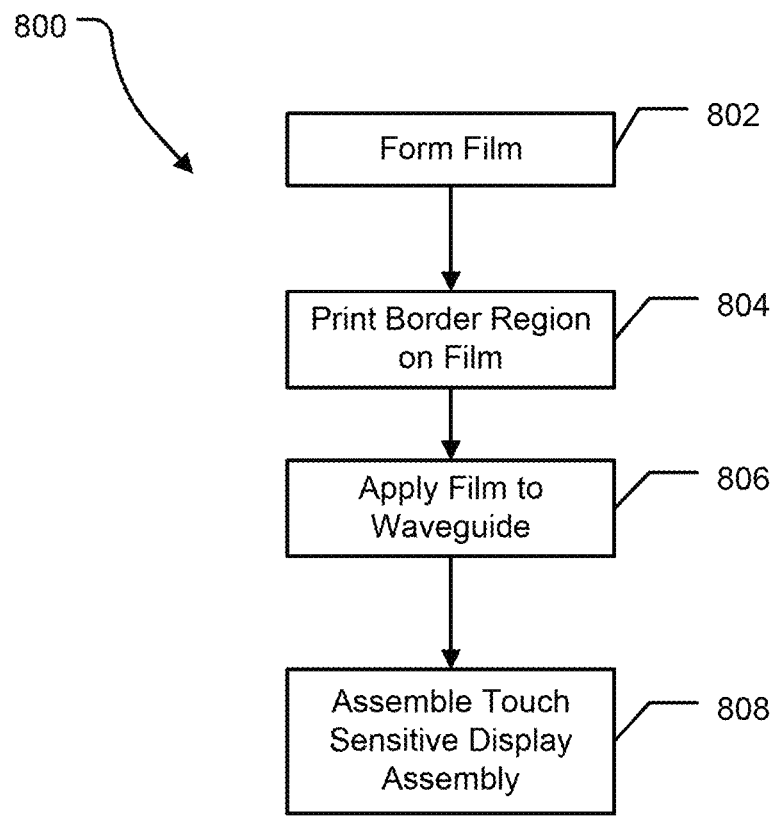
FIG. 8 is a flow diagram illustrating an exemplary method of forming a touch sensitive display assembly according to an aspect of the disclosure.

FIG. 8 is a flow diagram illustrating a method 800 for forming a touch sensitive display assembly. At 602, a film is formed. The film can be a polyethylene terephthalate film. At 604, a border portion can be printed on the film. The border portion can be printed as a solid color with one or more colorants, such as inks, or can be printed with multiple colorants to form a pattern, image, or text visible when viewing the touch sensitive display assembly. At 606, the film can be applied to a surface of a waveguide, such as a glass or poly(methyl methacrylate) sheet. In various embodiments, the waveguide can be flat or curved. At 608, the touch sensitive display assembly can be assembled. In various embodiments, assembling can include positioning a flat panel display assembly, an emitter/detector assembly, and the waveguide and film such that the border portion of the film overlies the emitter/detector assembly and a transparent active display portion of the film overlies at least a portion of the flat panel display assembly.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a processor;
    a storage device in communication with the processor; and
    a touch sensitive display assembly in communication with the processor, the touch sensitive display assembly including:
        a display assembly operable to display images;
        an emitter/detector assembly;
        a waveguide;
        an opaque border portion of a surface overlying the emitter/detector assembly; and
        a transparent display area portion of the surface overlying at least a portion of the display assembly.

2. The information handling system of claim 1, wherein the waveguide includes glass.

3. The information handling system of claim 1, wherein the waveguide includes poly(methyl methacrylate).

4. The information handling system of claim 1, wherein the opaque border portion includes a colorant.

5. The information handling system of claim 1, wherein the opaque border portion includes multiple colorants arranged to form a pattern or text that can be seen when viewing the touch sensitive display assembly.

6. The information handling system of claim 1, wherein the waveguide is curved.

7. A touch sensitive display assembly comprising:
    a display assembly operable to display images;
    an emitter/detector assembly;
    a waveguide;
    an opaque border portion of a surface overlying the emitter/detector assembly; and
    a transparent display area portion of the surface overlying at least a portion of the display assembly.

8. The touch sensitive display assembly of claim 7, wherein the waveguide includes glass.

9. The touch sensitive display assembly of claim 7, wherein the waveguide includes poly(methyl methacrylate).

10. The touch sensitive display assembly of claim 7, wherein the opaque border portion includes a colorant.

11. The touch sensitive display assembly of claim 7, wherein the opaque border portion includes multiple colorants arranged to form a pattern or text that can be seen when viewing the touch sensitive display assembly.

12. The touch sensitive display assembly of claim 7, wherein the waveguide is curved.

13. A method comprising:
    applying a colorant to define an opaque border region and a transparent active display area portion of a waveguide; and
    assembling a touch screen display assembly including:
        a display assembly operable to display images;
        an emitter/detector assembly; and
        the waveguide;
    wherein the opaque border portion overlies the emitter/detector assembly, and the active display area portion overlies at least a portion of the display assembly.

14. The method of claim 13, wherein the waveguide includes glass.

15. The method of claim 13, wherein waveguide includes poly(methyl methacrylate).

16. The method of claim 13, wherein applying the colorant includes applying the colorant as a solid color to the opaque border region.

17. The method of claim 13, wherein applying the colorant includes applying multiple colorants to form a pattern or text that can be seen when viewing the touch sensitive display assembly.

18. The method of claim 13, wherein waveguide is curved.

* * * * *